US012728325B2

(12) United States Patent
Zucchetto et al.

(10) Patent No.: US 12,728,325 B2
(45) Date of Patent: Sep. 8, 2026

(54) EXPANDABLE COMPONENT

(71) Applicant: Eaton Intelligent Power Limited, Dublin (IE)

(72) Inventors: Daniel Zucchetto, Dublin (IE); Daniel Browne, Rathgar (IE); Padhraig Ryan, Keatingstown (IE)

(73) Assignee: EATON INTELLIGENT POWER LIMITED, Dublin (IE)

( * ) Notice: Subject to any disclaimer, the term of this patent is extended or adjusted under 35 U.S.C. 154(b) by 726 days.

(21) Appl. No.: 18/255,782

(22) PCT Filed: Dec. 9, 2020

(86) PCT No.: PCT/EP2020/085183

§ 371 (c)(1),
(2) Date: Jun. 2, 2023

(87) PCT Pub. No.: WO2022/122142

PCT Pub. Date: Jun. 16, 2022

(65) Prior Publication Data

US 2024/0293709 A1 Sep. 5, 2024

(51) Int. Cl.

| | |
|---|---|
| ***A63B 53/14*** | (2015.01) |
| ***H02J 7/70*** | (2026.01) |
| ***H02J 50/00*** | (2016.01) |

(52) U.S. Cl.
CPC ................ *A63B 53/14* (2013.01); *H02J 7/70* (2026.01); *H02J 50/005* (2020.01); *A63B 2220/833* (2013.01)

(58) Field of Classification Search
CPC ... A63B 53/14; A63B 2220/833; A63B 55/00; A63B 55/40; H02J 7/70; H02J 7/00; H02J 50/005; H02J 50/10
See application file for complete search history.

(56) References Cited

U.S. PATENT DOCUMENTS 10,069,326 B2 * 9/2018 Huang .................. A63B 55/00
10,506,854 B2 * 12/2019 Akin ..................... A45B 23/00
(Continued)

FOREIGN PATENT DOCUMENTS

CN 108365660 A 8/2018
CN 109038845 A * 12/2018 ............. H02J 50/40
(Continued)

*Primary Examiner* — Jared Fureman
(74) *Attorney, Agent, or Firm* — LEYDIG, VOIT & MAYER, LTD.

(57) ABSTRACT

An expandable component of a charging device comprising an outer boundary configured, in use, to be displaced. The expandable component also comprises a rotatable member, in communication with the outer boundary via a connecting member; and a guiding portion configured to translate a rotation of the rotatable member into a motion of the connecting member such that the outer boundary moves between a first position and a second position. The outer boundary is arranged to contact an inner wall of a container. The rotatable member is configured to rotate in response to a rotational input. The expandable component therefore preferably provides the charging device with an adjustable system that allows the charging device to integrate with any container by physically changing the dimensions of the expandable component to match the dimensions of the container.

20 Claims, 7 Drawing Sheets

(56) References Cited

U.S. PATENT DOCUMENTS

| | | | | | |
|---|---|---|---|---|---|
| D966,187 | S | * | 10/2022 | Zucchetto | D13/108 |
| 2008/0179846 | A1 | | 7/2008 | Dube et al. | |
| 2018/0013308 | A1 | | 1/2018 | Huang et al. | |
| 2019/0314703 | A1 | * | 10/2019 | Onuki | A63B 69/3632 |
| 2023/0256305 | A1 | * | 8/2023 | Kelly | H02J 50/10<br>320/108 |

FOREIGN PATENT DOCUMENTS

| | | | | | |
|---|---|---|---|---|---|
| CN | 210468866 | U | | 5/2020 | |
| CN | 111497632 | A | | 8/2020 | |
| JP | 2008 073210 | A | | 4/2008 | |
| KR | 20120051033 | A | * | 5/2012 | H02J 7/731 |
| TW | M449402 | U | * | 3/2013 | H02J 50/90 |

* cited by examiner 600
610
612
604
608
606
602
624
622
620

604
612
610
606
608
602
600
620
624
622

EXPANDABLE COMPONENT

FIELD OF THE DISCLOSURE

The present disclosure relates to an expandable component and finds particular, although not exclusive, utility in a charging device for electronic sporting equipment, such as a smart golf club.

BACKGROUND TO THE DISCLOSURE

One of the most important factors affecting the performance of athletes in club, bat or racket based sports is the athlete's grip on their club, bat or racket. Minor changes in grip position and force can have a significant impact on the outcome of a shot or other sporting action. For example, in golf, a shot taken with a minor change in a golfer's grip, such as a 1° change in angle around the shaft, may result in at least a metre change in position of the ball after the shot. Golfers, along with other athletes, may vary their grip depending on their desired shot outcome. Typically, athletes understand that altering their grip will alter the shape, flight and distance of their shot. Some athletes may aim to use a highly consistent grip placement and force whilst altering some other aspect of their swing. For a right-handed golfer, a swing with a so-called strong grip, which is a term used to describe a grip in which the golfer's left thumb and index finger align with their shoulder and/or neck when addressing a shot, may result in the ball travelling further left than the same swing made with a so-called neutral or weak grip. A strong grip is also understood to close a clubface and effectively reduce the loft of the club, resulting in a shot that flies lower and travels further when compared to a shot made with a neutral or weak grip. Accordingly, the athlete's grip has a large impact on the shot outcome.

Typically, athletes receive feedback on their grip, and the resulting shot, through coaching or practice, often including video feedback. However, the athlete's grip is not the only factor that affects the outcome of their shot. For example, the swing path of a golf shot and environmental factors such as wind also have a significant effect on the outcome of the shot. As there are many factors affecting shot outcomes and small changes in the athlete's grip can have a large impact on the shot outcome, it is difficult for inexperienced athletes and coaches to correctly diagnose and fix grip faults. Furthermore, even elite level athletes and coaches may find it difficult to correctly diagnose and fix grip faults.

Alternatively, athletes may receive feedback on their grip from a smart device, such as a smart golf club. The smart golf club incorporates sensors to measure aspects of the golfers grip and/or performance such as movement. However, the smart golf club requires a power source to provide power for data collection and data transmission. A charging unit for the power source may be placed at the bottom of a golf bag to enable recharging of the smart golf club during a round of golf. However, different golf bags may comprise different shapes and/or sizes. Therefore, it is desirable to provide a device that may allow the charging unit to fit in all types of bags.

SUMMARY OF THE DISCLOSURE

In accordance with a first aspect of the present disclosure, there is provided an expandable component of a charging device comprising: an outer boundary configured, in use, to be displaced; a rotatable member, in communication with the outer boundary via a connecting member; and a guiding portion configured to translate a rotation of the rotatable member into a motion of the connecting member such that the outer boundary moves between a first position and a second position; wherein the outer boundary is arranged to contact an inner wall of a container; and the rotatable member is configured rotate in response to a rotational input.

A key advantage of the present disclosure is that the expandable component may provide the charging device with an adjustable system that allows the charging device to integrate with any container by physically changing the dimensions of the expandable component to match the dimensions of the container.

The container may be a golf bag. The expandable component may be placed in the base or lower portion of the golf bag. The charging device may be configured to charge an object, such as a smart golf club. The charging device may be appended or attached to a top surface of the expandable component.

Alternatively, the expandable component may cooperate with or operate with another type of sports bag or equipment bag. The object may be another piece of sports equipment, such as a baseball bat, a tennis racket, a badminton racket, a cricket bat, a hockey stick, a hurley, a lacrosse stick, a table tennis paddle, a fishing rod, or any other known sports equipment having smart functionality. Accordingly, a user may charge the smart equipment throughout an event or session.

Preferably, the rotatable member is substantially circular, having a curvature, and comprises a gripping portion. Accordingly, a user may easily apply a rotational force to the rotatable member.

Preferably, the gripping portion is an indent. The gripping portion may comprise a plurality of alternating indents and teeth placed around a circumference of the rotatable member. Accordingly, the rotatable member may be a gear. Advantageously, the gear may be easily rotated. Moreover, the gear may easily be manufactured.

Preferably, the guiding portion comprises: a guide located on the rotatable member; and a ridge abutting the connecting member; wherein the ridge is arranged in communication with the guide. The ridge may be substantially cylindrical in shape, having a ridge width and a ridge height. Alternatively, the ridge may be any suitable shape for communicating with the guide, such as cone-shaped.

Preferably, the guide extends from a first radial position of the rotatable member to a second radial position of the rotatable member. Further preferably, the second radial position has a greater radial displacement relative to a centre of the rotatable member, than the first radial position. In this way, the guide may allow the ridge to move between the first radial positon and the second radial position, thereby allowing the ridge to move radially outwards relative to the centre of the rotatable member. Advantageously, the ridge may in turn cause the outer boundary to move radially outwards via the connecting member in a fixed, secure and adjustable manner.

Preferably, the guide is an indent. In this way the ridge may extend through the indent, from a first side of the rotatable member to a second side of the rotatable member. Advantageously, with this arrangement, the expandable component may take up less space and may be more robust. Preferably, the indent comprises an indent curvature. In this way, the indent may translate the rotational force applied to the rotatable member to a force on the ridge, causing the ridge to move radially outwards in response to the force in a smooth manner.

Preferably, the outer boundary is a rigid bar. Advantageously, the rigid bar may allow the expandable component to be robust in construction and use. Preferably, the bar comprises a bar of curvature substantially matching the curvature of the rotatable member. In this way, the bar may maximise contact with an inner wall of a substantially cylindrical container. Alternatively, the bar may be any shape.

The bar may further comprise an adhesive portion. The adhesive portion may be proximate an outer surface of the bar, configured to contact the container. Advantageously, when the outer boundary extends radially outwards and comes into contact with an inner wall of the container, the adhesive portion may reduce the expandable components movement in response to external forces, such as during movement of the container and may fit the expandable component (e.g. with the charging device) in place. The adhesive portion may be one part of a Velcro pair fixing, with the other part of the Velcro pair fixed to the inner wall of the container. Alternatively, the adhesive portion may be a magnetic strip configured to provide an attractive force with a magnet of opposite polarity within a wall of the container. Alternatively, any suitable adhesive or fixing portion may be used to facilitate an attachment of the outer boundary to the inner wall of the container.

In some preferable embodiments, the expandable component further comprises: a sensor located on an outer portion of the outer boundary, configured to sense a proximity of the outer boundary to the object; a driving member in communication with the rotatable member, configured to rotate the rotatable member; and a microcontroller in communication with the sensor and the driving member, configured to: receive a sensor signal from the sensor; activate the driving member; and deactivate the driving member in response to a contact signal indicative of the outer boundary contacting the object. Advantageously, the operation and sensitivity of the expandable component may be improved. Further advantageously, the expandable component may be automatically expandable using the driving member and may be more efficient and easy to use.

The sensor may be any one selected from the range of: a proximity sensor; and a pressure sensor. Alternatively, the sensor may be any sensor suitable for sensing a proximity of the object. For example, the sensor may be a Hall Effect sensor. The Hall Effect sensor may detect a nearby magnetic field originating from, for example, a magnetic strip present in the golf bag.

Preferably, the microcontroller is in communication with a remote computing device, the remote computing device being configured to transmit one selected from the range of: an activation signal; and a deactivation signal. The remote computing device may be a smart watch or a smart phone. Alternatively, the remote computing device may be any device suitable for communicating with the microcontroller. In this way, the user may communicate with the expandable component using the remote computing device. Advantageously, the expandable component may be easier to use and no specialist equipment is required.

In some embodiments, the expandable component further comprises a physical resistance sensor in communication with the driving member, said physical resistance sensor being configured to: measure a physical resistance of the driving member; and transmit a resistance signal. In this way, the physical resistance of the driving member may be measured which may be indicative of the driving member being unable to expand the expandable component further. The driving member may be unable to expand the expandable component further due to the ridge meeting the second radial position of the guide or the outer boundary coming into contact with an inner wall of the container. Advantageously, a risk of damaging the container may be reduced.

Preferably, the microcontroller is configured to: activate the driving member in response to an activation signal; and deactivate the driving member in response to a deactivation signal. In this way, the use may control and moderate the expansion of the expandable component.

Preferably, an outer side of the outer boundary comprises a first height and an inner side of the outer boundary comprises a second height, wherein the first height is greater than the second height such that the outer boundary comprises a substantially sloped face. In this way, an object placed above the outer boundary may be biased into moving down the substantially sloped face, towards an area which may contain the charging device. Advantageously, with this feature the object may be likely to be charged.

Preferably, the expandable component further comprises an elastic portion connecting the outer boundary to the rotatable member, configured to expand as the outer boundary moves from the first position to the second position. Advantageously, objects may be less likely to fall through gaps that may be present in the expandable component. Further advantageously, the elastic portion may be lighter than alternative mechanisms such as an accordion-like mechanism. The elastic portion may also occupy a lower volume when the expandable component is in a compact state. The elastic portion may be connected to an outer face of the outer boundary such that the elastic portion comprises a slope. Advantageously, an object placed on the elastic portion may be biased into moving down the substantially sloped face, towards an area which may contain the charging device.

Preferably, the expandable component further comprises a charging device. The charging device may be appended, abutted or connected in any way to an upper surface of the expandable component. Preferably, the charging device is placed in a position to maximise contact with an object.

In some preferable embodiments, the charging device is a charging coil connected to the outer boundary and the rotatable member, configured to move with the outer boundary as the outer boundary moves from the first position to the second position. In this way, the charging device may be easily compacted for transfer and repeated use as necessary, whilst maximising contact with an object, for example a golf club, in the expanded configuration.

In some preferable embodiments, the expandable component further comprises: a plurality of outer boundaries configured to surround the rotatable member; a plurality of connecting members, each corresponding to a respective outer boundary; and a plurality of guiding members, each corresponding to a respective connecting member; wherein, in the first position, the outer boundaries form a concentric circle with the rotatable member. Accordingly, the outer boundaries may maximise contact with an inner wall of a substantially cylindrical container by being a substantially complete circle, the circumference of which closely matches the inner wall.

More than one set of boundaries forming more than one concentric circles can be envisaged.

In some embodiments, the expandable component further comprises a plurality of charging devices. In this way, a charging surface area may be increased.

Preferably, at least one of the plurality of charging devices are attached to a respective outer boundary such that: in the first position, the plurality of charging devices are configured to form a stack, wherein the stack is centred on the centre of the rotatable member; and in the second position, the outer boundary charging devices are displaced from the centre of the rotatable member with the respective outer boundary. In this way, the charging devices may be easily compacted with the expandable component in the first configuration, whilst also increasing the charging surface area in the second configuration.

According to a second aspect of the present disclosure, a method of expanding an expandable charging device is provided comprising the steps of: transmitting, via a remote device, an activation signal to a microcontroller; activating, via the microcontroller, a driving member; driving, via the driving member, a ridge along a guide between a first position to a second positon, such that an outer boundary expands radially outwards with respect to a rotatable member; receiving a proximity signal, from a proximity sensor, said proximity signal being indicative of an outer boundary being in proximity to an object; and receiving a resistance signal, from a physical resistance sensor, the physical resistance signal indicative of the ridge reaching the second position; and deactivating, via the microcontroller, the driving member in response to one selected from the range of: the proximity signal meeting a proximity signal threshold; and the resistance signal reaching a resistance signal threshold such that the expandable charging device no longer expands.

In accordance with a third aspect of the present disclosure, a method of contracting an expandable charging device is provided comprising the steps of: transmitting, via a remote device, a deactivation signal to a microcontroller; activating, via the microcontroller, a driving member; driving, via the driving member, a ridge along a guide between a second position to a first position, such that an outer boundary contracts radially inwards with respect to a rotatable member; receiving, from a physical resistance sensor, a resistance signal, the resistance signal indicative of the ridge reaching the first position; and deactivating, via the microcontroller, the driving member in response to the resistance signal meeting a resistance signal threshold.

DETAILED DESCRIPTION

Figures 1A, 1B:
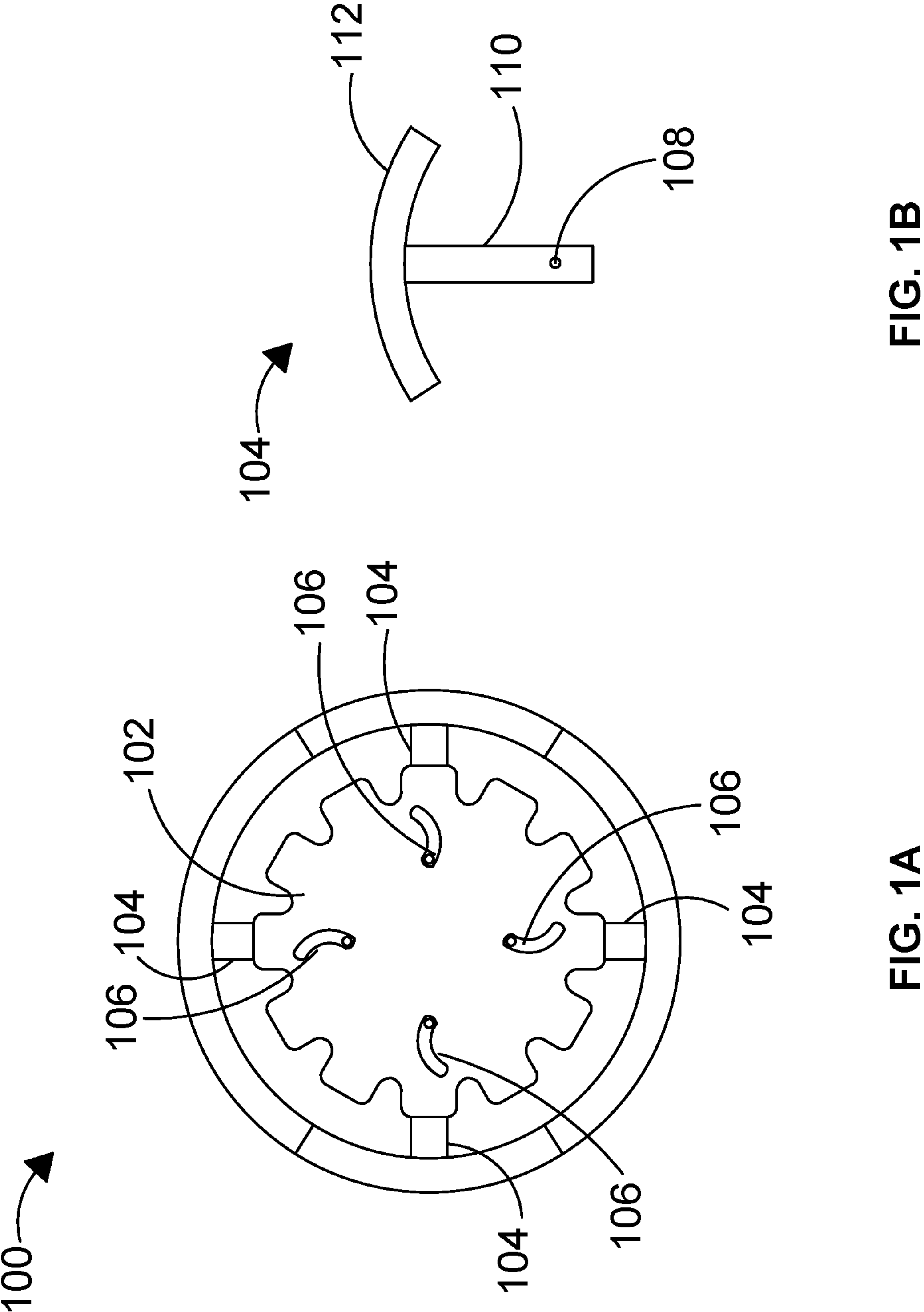
FIG. 1*a* is a top-down view of an expandable component in a compressed configuration according to a first embodiment of the present disclosure.
FIG. 1*b* is a top-down view of an extendable member of the expandable device of FIG. 1*a;*

FIG. 1*a* is a top-down view of an expandable component 100 in a compressed configuration according to a first embodiment of the present disclosure. The device 100 includes a rotatable gear 102 and four extendable members 104. The gear 102 is in communication with each of the extendable members 104 via a respective guide 106 and a corresponding ridge 108. Whilst the present embodiment comprises four extendable members 104, it shall be appreciated that additional embodiments exist wherein the expandable component 100 comprises a different number of extendable members 104, such as six.

The gear 102 is substantially circular in shape such that the gear 102 comprises a circumference and a central point. The gear 102 further comprises a plurality of periodically repeating indents and teeth around the circumference, wherein the indents are configured to accommodate a user's finger and/or other external member such as a bar.

The following embodiments are described in relation to a single extendable member and guide engagement formation. It will be understood by the skilled addressee that similar in use embodiments are intended within the scope of the present application, in which the additional extendable member and guide engagement formations mirror the example described.

The guide 106 is an indent 106, comprising a curvature extending between a first end and a second end of the indent 106. The first end of the indent 106 comprises a first radial displacement and the second end of the indent 106 comprises a second radial displacement, the radial displacements being with respect to the central point of the gear 102. The second radial displacement is greater than the first radial displacement such that the second end of the indent is further away from the central point of the gear 102.

With reference to FIG. 1*b*, a top-down view of an extendable member 104 of the expandable component 100 is depicted. The extendable member 104 comprises a substantially rectangular extension bar 110 extending longitudinally along a longitudinal axis. The skilled person will understand that the extension bar 110 may be any suitable shape. Proximate a first end of the extension bar 110, the extendable member 104 comprises a boundary bar 112. The boundary bar 112 comprises a curvature and extends along an axis orthogonal to the longitudinal axis. An inner surface of the boundary bar 112 may be attached to the first end of the extension bar 110 via an adhesive material. Alternatively, the boundary bar 112 and the extension bar 110 may form a unitary integrally moulded structure. Alternatively, the boundary bar 112 may be attached to the first end of the extension bar 110 via a fastening member such as a screw.

A ridge 108 protrudes from an upper surface of the extension bar 110 along an axis orthogonal to the longitudinal axis and the axis of the boundary bar 112. The ridge 108 protrudes from the extension bar 110 proximate a second end, opposing the first end, of the extension bar 110. The ridge 108 is substantially cylindrical in shape, comprising a central axis orthogonal to the longitudinal axis. The skilled addressee will understand that the ridge 108 may be any suitable shape, such as cuboid or cone-shaped. A diameter of the substantially cylindrical ridge 108 is less than a width of the guide 106 such that, the ridge 108 of the extendable member 104 extends through the respective guide 106.

In the compact configuration depicted in FIG. 1*a*, the ridge 108 extends through the first end of the guide 106 and the extension bar 110 extends radially outwards with respect to the central point of the gear 102, proximate a lower face of the gear 102. The four curved boundary bars 112 constitute a complete outer boundary circle.

Figure 1C:
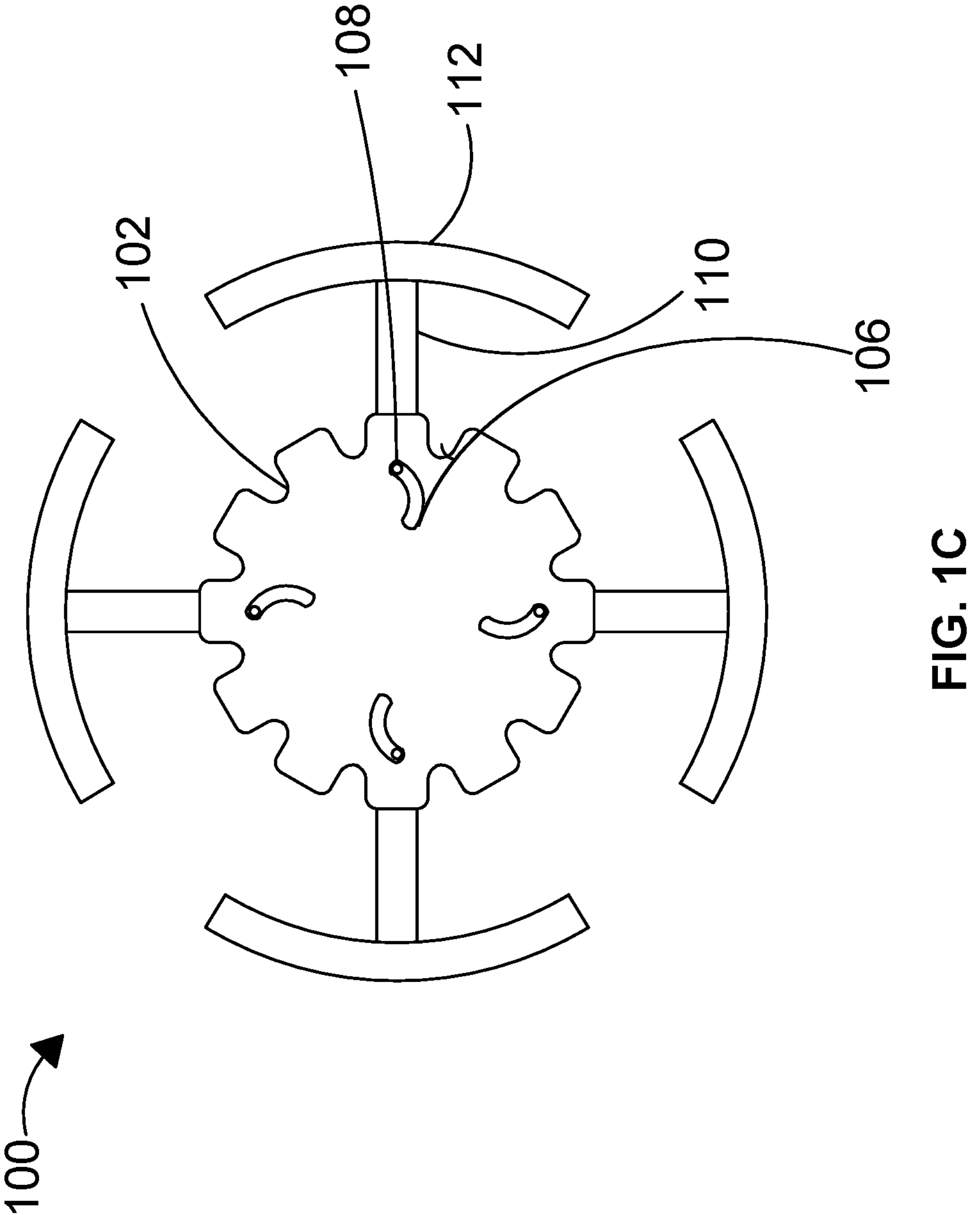
FIG. 1*c* is a top-down view of an expandable component of FIG. 1*a* in an expanded configuration.

In use, and with reference to FIG. 1*c* which shows a top-down view of the device 100 in an expanded configuration, a user may place one or more of their fingers in the indents between the teeth of the gear 102. The user applies a first force to the gear 102 by rotating the gear 102 about its rotational axis, causing the gear 102 to rotate in a direction corresponding to the first force. The first force is then transferred to the ridge 108 via the guide 106, causing the ridge 108 to move radially outward with respect to the central point of the gear 102. The ridge 108, being attached to the extension bar 110, causes the extendable member 104 to also move radially outward with respect to the central point of the gear 102. The ridge 108 continues to move radially outwards until the ridge 108 meets the second end of the guide 106, at which point an inner surface of the gear 102 blocks the ridge 108 from moving further outwards. Alternatively, the ridge 108 may continue to move radially outwards until an outer surface of the boundary bar 112 meets an inner wall of a container, the container being the golf bag. The inner wall stops the ridge 108 from moving further outwards.

When the ridge 108 is proximate the second end of the guide 106, the device 100 is in an expanded configuration, as shown on FIG. 1*c*. In the expanded configuration, the four curved boundary bars 112 are no longer in contact and no longer constitute a complete outer boundary circle.

In order to return the device 100 to the unexpanded configuration, the user may place one or more of their fingers in the indents between the teeth of the gear 102. The user applies a second force to the gear 102 by rotating the gear 102 about its rotational axis in a direction opposing the direction of the first force, causing the gear 102 to rotate in a direction corresponding to the second force. The second force is then transferred to the ridge 108 via the guide 106, causing the ridge 108 to move radially inward with respect to the central point of the gear 102. The ridge 108, being attached to the extension bar 110, causes the extendable member 104 to also move radially inward with respect to the central point of the gear 102. The ridge 108 continues to move radially inwards until the ridge 108 meets the first end of the guide 106, at which point the inner surface of the gear 102 blocks the ridge 108 from moving further inwards.

A charging device is placed on an upper surface of the gear 102.

The device 100 further comprises a hook component of a Velcro tape attached to the outer surface of the boundary bar 112, configured to cause the device to stick to the golf bag following the outer surface of the boundary bar 112 contacting the a loop component of a Velcro tape attached to the inner wall of the golf bag. Alternatively, the boundary bar 112 may comprise a magnetic strip configured to attract to a magnetic strip comprised in the inner wall of the golf bag.

Figure 2:
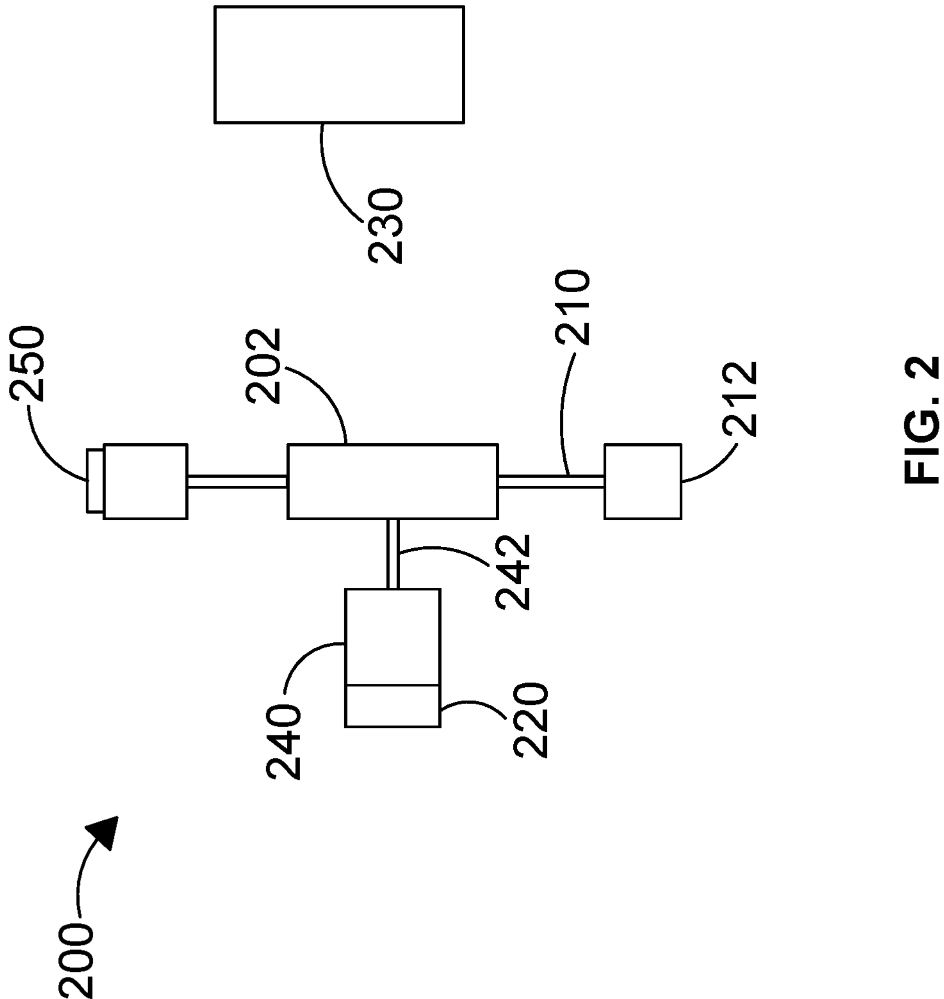
FIG. 2 is a top-down view of an automatic expandable component according to a second embodiment of the present disclosure.

Turning now to FIG. 2, there is shown a top-down view of an automatic expandable component 200 according to a second embodiment of the present disclosure.

The automatic expandable component 200 is substantially similar to the expandable component 100 in that the device 200 includes a rotatable gear 202 and four extendable members 204. The gear 202 is in communication with each of the extendable members 204 via a respective guide (not shown) and a corresponding ridge (not shown).

The gear 202 is substantially circular in shape such that the gear 202 comprises a circumference and a central point. The gear 202 further comprises a plurality of periodically repeating indents and teeth around the circumference, wherein the indents are configured to accommodate a user's finger and/or other external member. It shall be noted that in this embodiment, the indents and teeth are preferable only.

The following embodiments are described in relation to a single extendable member and guide engagement formation. It will be understood by the skilled addressee that similar in use embodiments are intended within the scope of the present application, in which the additional extendable member and guide engagement formations mirror the example described.

The guide is an indent, comprising a curvature extending between a first end and a second end of the indent. The first end of the indent comprises a first radial displacement and the second end of the indent comprises a second radial displacement, the radial displacements being with respect to the central point of the gear 202. The second radial displacement is greater than the first radial displacement such that the second end of the indent is further away from the central point of the gear 202.

The extendable member 204 comprises a substantially rectangular extension bar 210 extending longitudinally along a longitudinal axis. The skilled person will understand that the extension bar 210 may be any suitable shape. Proximate a first end of the extension bar 210, the extendable member 204 comprises a boundary bar 212. The boundary bar 212 comprises a curvature and extends along an axis orthogonal to the longitudinal axis. An inner surface of the boundary bar 212 may be attached to the first end of the extension bar 210 via an adhesive material. Alternatively, the boundary bar 212 and the extension bar 210 may form a unitary integrally moulded structure. Alternatively, the boundary bar 212 may be attached to the first end of the extension bar 210 via a fastening member such as a screw.

A ridge protrudes from an upper surface of the extension bar 210 along an axis orthogonal to the longitudinal axis and the axis of the boundary bar 212. The ridge protrudes from the extension bar 210 proximate a second end, opposing the first end, of the extension bar 210. The ridge is substantially cylindrical in shape, comprising a central axis orthogonal to the longitudinal axis. The skilled addressee will understand that the ridge may be any suitable shape, such as cuboid or cone-shaped. A diameter of the substantially cylindrical ridge is less than a width of the guide such that, the ridge of the extendable member 204 extends through the respective guide.

In the configuration depicted in FIG. 2, the ridge extends through the first end of the guide and the extension bar 210 extends radially outwards with respect to the central point of the gear 202, proximate a lower face of the gear 202. The four curved boundary bars 212 constitute a complete outer boundary circle.

In the embodiment shown in FIG. 2, the automatic expandable component 200 further comprises a microcontroller 220 that is adjacent to the gear 202 and is in communication with a smart device 230. The microcontroller may be physically or wirelessly connected to the smart device 230 such as a smart phone or a smart watch. For example, the microcontroller 220 and the smart device 230 may communicate wirelessly via WiFi or Bluetooth.

The automatic expandable component 200 also includes a motor 240 in communication with the microcontroller 220. The motor 240 is any suitable device capable of converting electrical energy into mechanical energy, such as a stepper motor and comprises a power supply and an ammeter. The motor is operable to rotate the gear 202 in a first direction or a second direction. In the present embodiment, the motor 240 is connected to the central point of the lower surface of the gear 202 via a connecting portion 242 such that rotation of the motor 240 rotates the gear 202.

The automatic expandable component 200 also comprises a proximity sensor 250 adjacent to an outer surface of the boundary bar 212, in communication with the microcontroller 220. In the present embodiment, there is a proximity sensor 250 adjacent to the outer surface of each of the boundary bars 212. Alternatively, the proximity sensor 250 may be adjacent to the outer surface of a single boundary bar 212 or any number of boundary bars 212. The proximity sensor 250 is any suitable device capable of sensing the proximity of an inner wall of a container, such as a pressure sensor.

Figure 3:
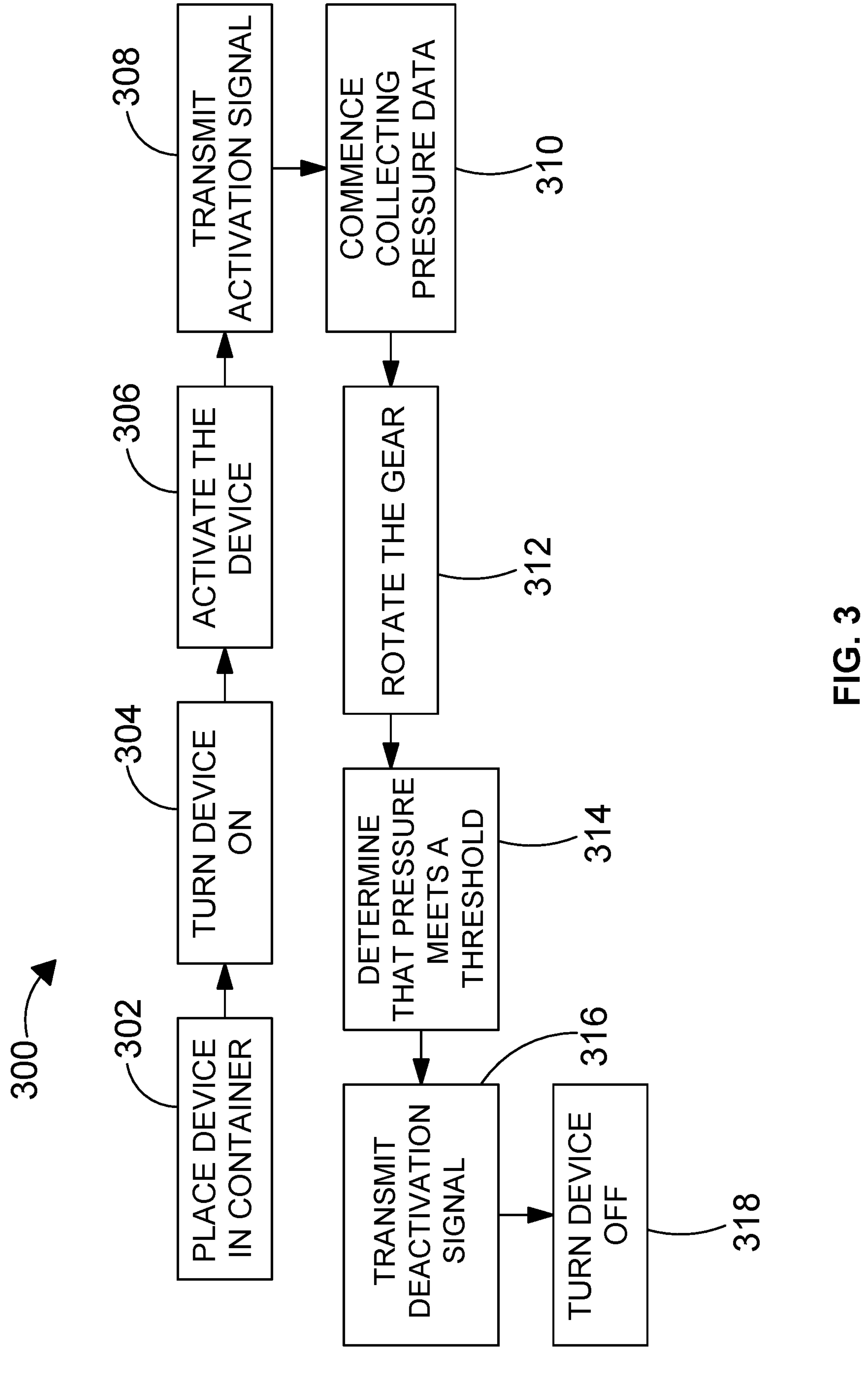
FIG. 3 is a flow diagram showing a method of expanding the automatic expandable component of FIG. 2.

In use and with reference to FIG. 3, an automatic expansion method 300 is depicted using the automatic expandable component 200.

At step 302 of the method 300, the automatic expandable component 200 is placed within a container. In this case, the container is a golf bag and the device 200 is placed at the bottom.

At step 304, the device 200 is switched on. The device 200 may be switched on via a switch (not shown) or via a user using the smart device 230.

At step 306, the user activates the device 200 by using the smart device 230.

At step 308, the smart device 230 transmits an activation signal to the microcontroller 220. The activation signal is indicative of the start of the expansion process.

At step 310, the pressure sensor 250 commences collecting pressure data and the ammeter commences collecting current data. The pressure sensor 250 continuously transmits the pressure data to the microcontroller 220 and the ammeter continuously transmits the current data to the microcontroller 220.

At step 312, the motor 240 activates and rotates the gear 202 in a first direction via the connecting portion 242. A force is then transferred to the ridge via the guide, causing the ridge to move radially outward with respect to the central point of the gear 202. The ridge, being attached to the extension bar 210, causes the extendable member 204 to also move radially outward with respect to the central point of the gear 202. The ridge continues to move radially outwards until the outer surface of the boundary bar 212 meets the inner wall of the golf bag.

At step 314, the pressure data meets a pressure threshold, indicative that the outer surface of the boundary bar 212 has met the inner wall of the golf bag. Alternatively, step 314 may comprise the current data meeting a current threshold, indicative that the motor 240 is unable to rotate further. The motor 240 may be unable to rotate further due to either the boundary bar meeting the inner wall of the golf bag or the ridge meeting the second end of the guide.

At step 316, the microcontroller transmits a de-activation signal to the motor 240, causing the motor 240 to cease rotation of the gear 202.

Following step 318, the device 200 may be switched off.

Figure 4:
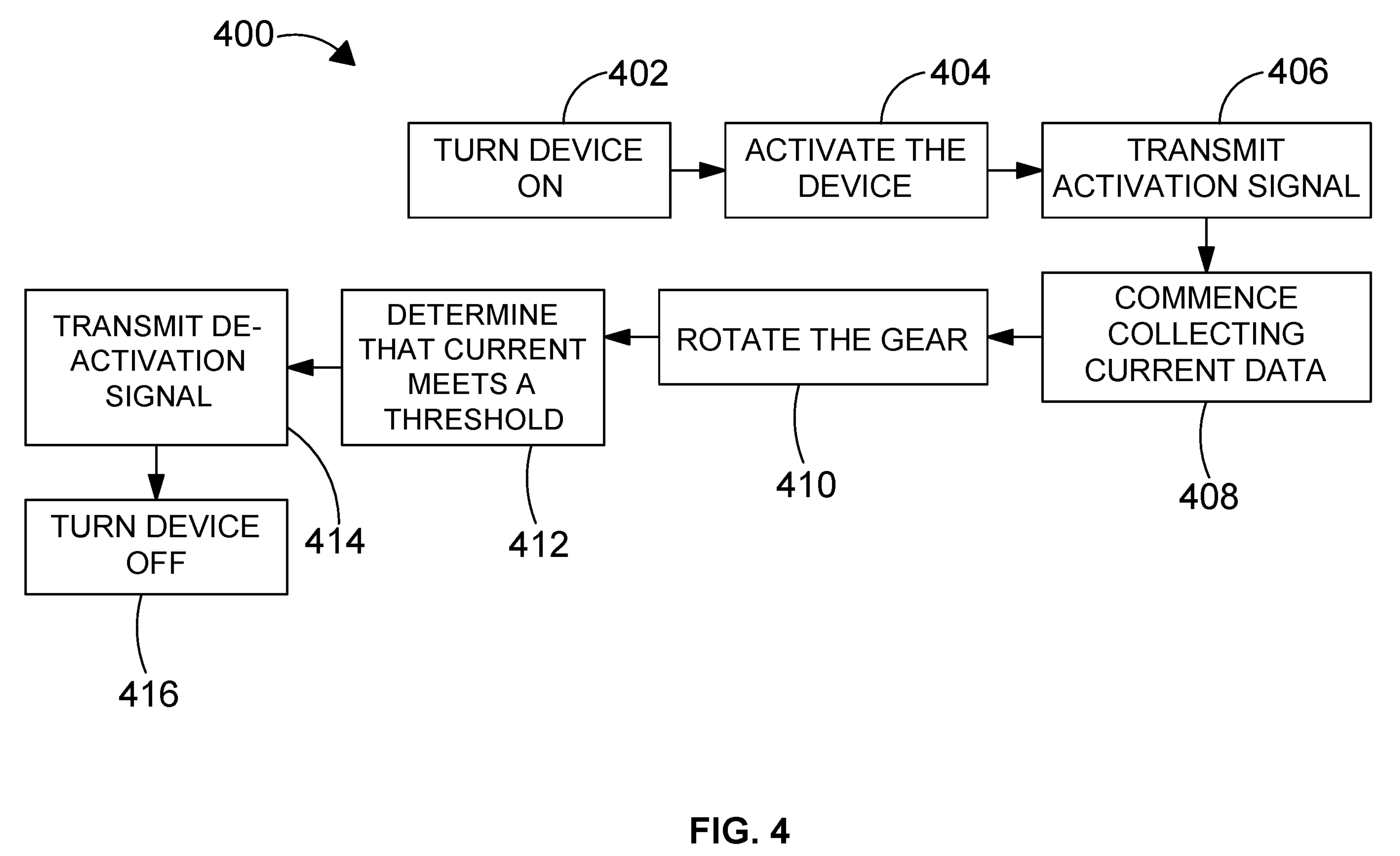
FIG. 4 is a flow diagram showing a method of compressing the automatic expandable component of FIG. 2.

In use and with reference to FIG. 4, an automatic compression method 300 is depicted using the automatic expandable component 200.

At step 402, the device 200 is switched on. The device 200 may be switched on via a switch (not shown) or via a user using the smart device 230.

At step 404, the user activates the device 200 by using the smart device 230.

At step 406, the smart device 230 transmits an activation signal to the microcontroller 220. The activation signal is indicative of the start of the compression process.

At step 408, the ammeter commences collecting current data. The ammeter continuously transmits the current data to the microcontroller 220.

At step 410, the motor 240 activates and rotates the gear 202 in a second direction via the connecting portion 242. A force is then transferred to the ridge via the guide, causing the ridge to move radially inward with respect to the central point of the gear 202. The ridge, being attached to the extension bar 210, causes the extendable member 204 to also move radially inward with respect to the central point of the gear 202. The ridge continues to move radially inwards until the ridge meets the first end of the guide.

At step 412, the current data meets a current threshold, indicative that the motor 240 is unable to rotate further.

At step 414, the microcontroller transmits a de-activation signal to the motor 240, causing the motor 240 to cease rotation of the gear 202.

At step 416, the device 200 may be switched off.

Figure 5:
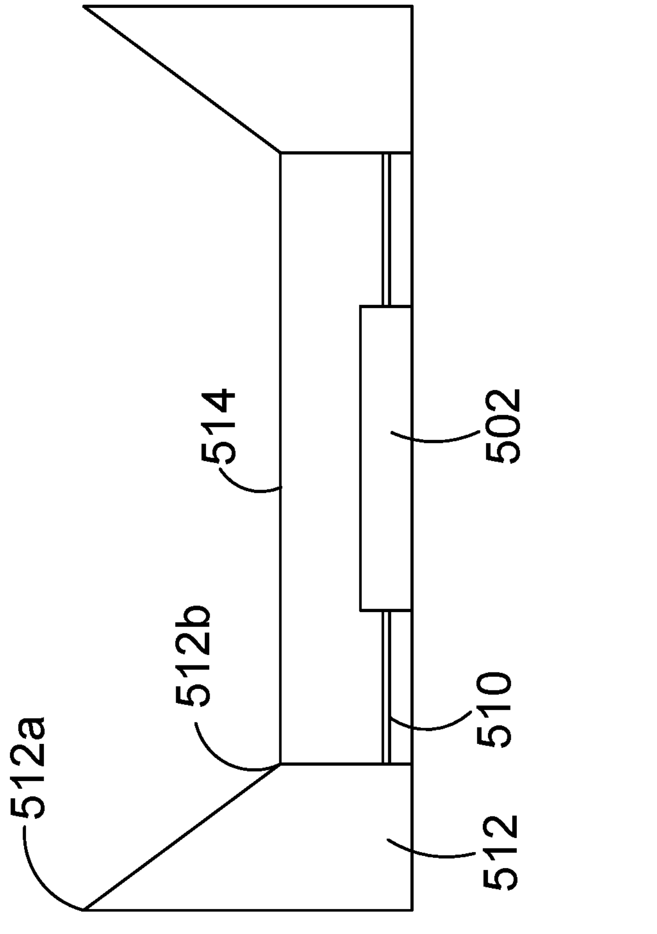
FIG. 5 is a side view of an expandable component in accordance with a third embodiment of the present disclosure.

FIG. 5 shows a side view of an expandable component 500 according to a third embodiment of the present disclosure.

The expandable component 500 is substantially similar to the expandable component 100 in that the device 500 includes a rotatable gear 502 and four extendable members 504. The gear 502 is in communication with each of the extendable members 504 via a respective guide (not shown) and a corresponding ridge (not shown).

The gear 502 is substantially circular in shape such that the gear 502 comprises a circumference and a central point. The gear 502 further comprises a plurality of periodically repeating indents and teeth around the circumference, wherein the indents are configured to accommodate a user's finger and/or other external member. It shall be noted that in this embodiment, the indents and teeth are preferable only.

The following embodiments are described in relation to a single extendable member and guide engagement formation. It will be understood by the skilled addressee that similar in use embodiments are intended within the scope of the present application, in which the additional extendable member and guide engagement formations mirror the example described.

The guide is an indent, comprising a curvature extending between a first end and a second end of the indent. The first end of the indent comprises a first radial displacement and the second end of the indent comprises a second radial displacement, the radial displacements being with respect to the central point of the gear. The second radial displacement is greater than the first radial displacement such that the second end of the indent is further away from the central point of the gear.

The extendable member 504 comprises a substantially rectangular extension bar 510 extending longitudinally along a longitudinal axis. The skilled person will understand that the extension bar 510 may be any suitable shape. Proximate a first end of the extension bar 510, the extendable member 204 comprises a boundary bar 512. The boundary bar 512 comprises a curvature and extends along an axis orthogonal to the longitudinal axis. An inner surface of the boundary bar 512 may be attached to the first end of the extension bar 510 via an adhesive material. Alternatively, the boundary bar 512 and the extension bar 510 may form a unitary integrally moulded structure. Alternatively, the boundary bar 512 may be attached to the first end of the extension bar 510 via a fastening member such as a screw. In addition, an outer edge 512 of the boundary bar 512 comprises a first height and an inner edge 512*b* of the boundary bar 512 comprises a second height. The second height is less than the first height. An elastic material 514 is attached at a first end to the inner edge 512 and is attached at a second end to the gear 502. The elastic material 512 is also attached to consecutive extension bars 510. The elastic material 512 may also be attached to an outer edge of the boundary bar 512 such that the elastic material 512 extends at a slope.

A ridge (not shown) protrudes from an upper surface of the extension bar 510 along an axis orthogonal to the longitudinal axis and the axis of the boundary bar 512. The ridge protrudes from the extension bar 510 proximate a second end, opposing the first end, of the extension bar 510. The ridge is substantially cylindrical in shape, comprising a central axis orthogonal to the longitudinal axis. The skilled addressee will understand that the ridge may be any suitable shape, such as cuboid or cone-shaped. A diameter of the substantially cylindrical ridge is less than a width of the guide such that, the ridge of the extendable member 504 extends through the respective guide.

The device 500 may further comprise a microcontroller, a motor and a proximity sensor, similar to the device 200.

In use, the device 500 may be operated using the method 300 or a user may place one or more of their fingers in the indents between the teeth of the gear 502. The user applies a first force to the gear 502 by rotating the gear 502 about its rotational axis, causing the gear 502 to rotate in a direction corresponding to the first force. The first force is then transferred to the ridge via the guide, causing the ridge to move radially outward with respect to the central point of the gear 502. The ridge, being attached to the extension bar 510, causes the extendable member 504 to also move radially outward with respect to the central point of the gear 502. As the extendable member 504 moves radially outward, the elastic material 514 is stretched such that a surface area of the elastic material increases and no gap is present between the gear 502 and the boundary bar 512. The ridge continues to move radially outwards until the ridge meets the second end of the guide, at which point an inner surface of the gear 502 blocks the ridge from moving further outwards. Alternatively, the ridge may continue to move radially outwards until an outer surface of the boundary bar 512 meets an inner wall of a container, the container being the golf bag. The inner wall stops the ridge from moving further outwards.

Figures 6A, 6B:
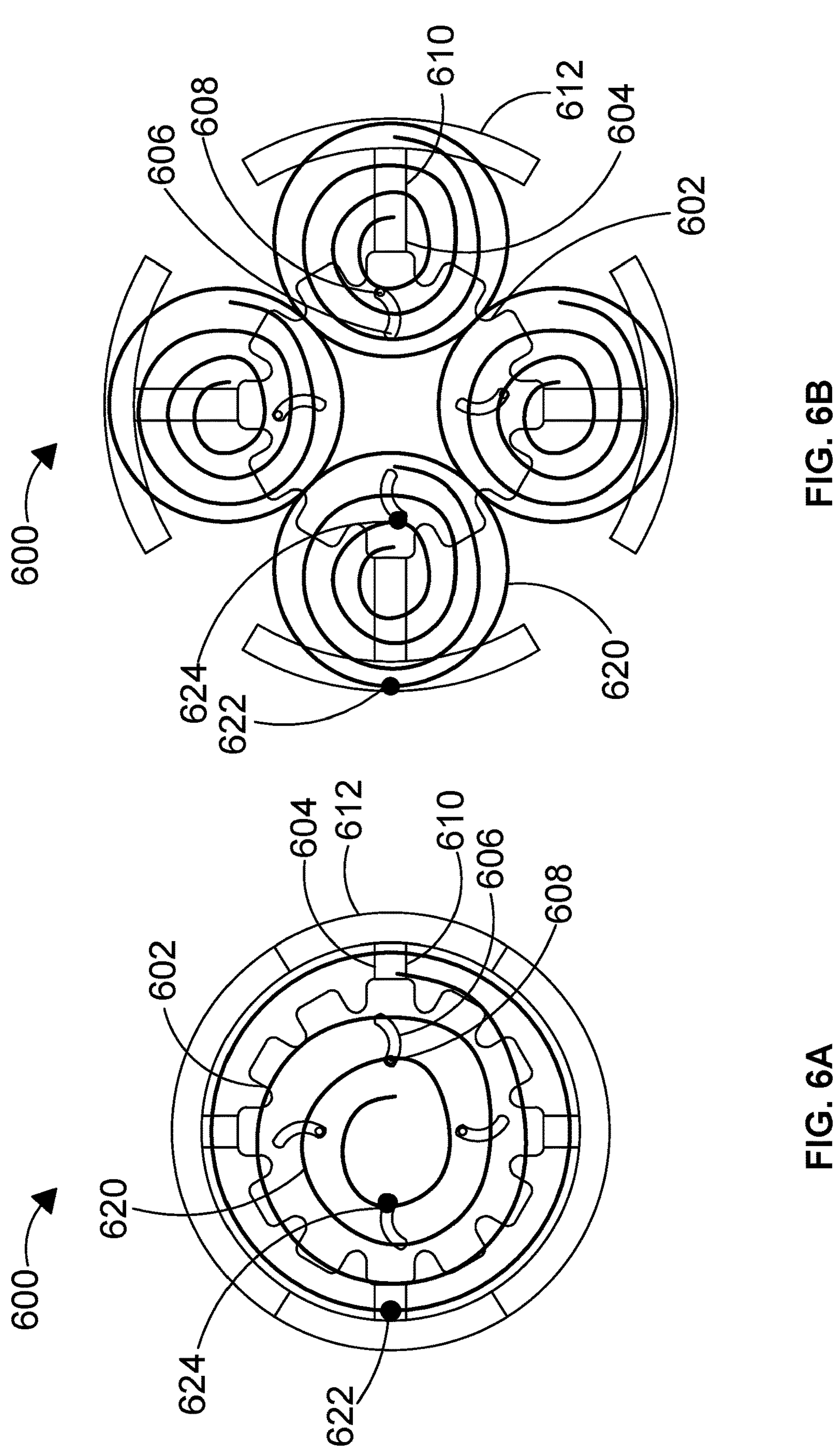
FIG. 6*a* is a top-down view of an expandable charging device in an expanded configuration in accordance with a fourth aspect of the present disclosure.
FIG. 6*b* is a top-down view of the expandable charging device of FIG. 6*b* in a compressed configuration.

Turning now to FIG. 6*a*, there is shown a top-down view of an expandable charging device 600 in an expanded configuration in accordance with a fourth embodiment of the present disclosure.

The expandable charging device 600 is substantially similar to the expandable component 100 in that the device 600 includes a rotatable gear 602 and four extendable members 604. The gear 602 is in communication with each of the extendable members 604 via a respective guide 606 and a corresponding ridge.

The gear 602 is substantially circular in shape such that the gear 602 comprises a circumference and a central point. The gear 602 further comprises a plurality of periodically repeating indents and teeth around the circumference, wherein the indents are configured to accommodate a user's finger and/or other external member. It shall be noted that in this embodiment, the indents and teeth are preferable only.

The following embodiments are described in relation to a single extendable member and guide engagement formation. It will be understood by the skilled addressee that similar in use embodiments are intended within the scope of the present application, in which the additional extendable member and guide engagement formations mirror the example described.

The guide 606 is an indent 606, comprising a curvature extending between a first end and a second end of the indent 606. The first end of the indent comprises a first radial displacement and the second end of the indent 606 comprises a second radial displacement, the radial displacements being with respect to the central point of the gear 602. The second radial displacement is greater than the first radial displacement such that the second end of the indent is further away from the central point of the gear 602.

The extendable member 604 comprises a substantially rectangular extension bar 610 extending longitudinally along a longitudinal axis. The skilled person will understand that the extension bar 610 may be any suitable shape. Proximate a first end of the extension bar 610, the extendable member 604 comprises a boundary bar 612. The boundary bar 612 comprises a curvature and extends along an axis orthogonal to the longitudinal axis. An inner surface of the boundary bar 612 may be attached to the first end of the extension bar 610 via an adhesive material. Alternatively, the boundary bar 612 and the extension bar 610 may form a unitary integrally moulded structure. Alternatively, the boundary bar 612 may be attached to the first end of the extension bar 610 via a fastening member such as a screw.

A ridge 608 protrudes from an upper surface of the extension bar 610 along an axis orthogonal to the longitudinal axis and the axis of the boundary bar 612. The ridge 608 protrudes from the extension bar 610 proximate a second end, opposing the first end, of the extension bar 610. The ridge 608 is substantially cylindrical in shape, comprising a central axis orthogonal to the longitudinal axis. The skilled addressee will understand that the ridge 608 may be any suitable shape, such as cuboid or cone-shaped. A diameter of the substantially cylindrical ridge 608 is less than a width of the guide 606 such that, the ridge 608 of the extendable member 604 extends through the respective guide 606.

In the configuration depicted in FIG. 6*a*, the ridge 608 extends through the first end of the guide 606 and the extension bar 610 extends radially outwards with respect to the central point of the gear 602, proximate a lower face of the gear 602. The four curved boundary bars 612 constitute a complete outer boundary circle.

In the embodiment shown in FIG. 6*a*, the automatic expandable component 600 further comprises four charging coils 620. The charging coils 620 each correspond to a respective extendable member 604 in that the charging coil 620 is attached to the boundary bar 612 at a first attachment point 622 and is attached to the ridge 608 at a second attachment point 624. It shall be appreciated by the skilled addressee that the attachment points 622, 624 are not limited to those depicted in FIG. 6*a*. The charging coils 620 are attached at different heights such that when the device 600 is in the compressed configuration shown in FIG. 6*b*, the charging coils 620 stack on top of each other.

The device 600 may further comprise a microcontroller, a motor and a proximity sensor, similar to the device 200.

In use, the device 600 may be operated using the method 300 or a user may place one or more of their fingers in the indents between the teeth of the gear 602. The user applies a first force to the gear 602 by rotating the gear 602 about its rotational axis, causing the gear 602 to rotate in a direction corresponding to the first force. The first force is then transferred to the ridge via the guide, causing the ridge to move radially outward with respect to the central point of the gear 602. The ridge, being attached to the extension bar 610, causes the extendable member 604 to also move radially outward with respect to the central point of the gear 602. As the extendable member 604 moves radially outward, charging coil 620 also moves radially outwards. The ridge continues to move radially outwards until the ridge meets the second end of the guide, at which point an inner surface of the gear 602 blocks the ridge from moving further outwards. In this configuration, the charging coils cover a maximum surface area. Alternatively, the ridge may continue to move radially outwards until an outer surface of the boundary bar 612 meets an inner wall of a container, the container being the golf bag. The inner wall stops the ridge from moving further outwards.

The invention claimed is:

1. An expandable component of a charging device comprising:
- an outer boundary configured, in use, to be displaced;
- a rotatable member, in communication with the outer boundary via a connecting member; and
- a guiding portion configured to translate a rotation of the rotatable member into a motion of the connecting member such that the outer boundary moves between a first position and a second position;
  - wherein the outer boundary is arranged to contact an inner wall of a container; and
  - the rotatable member is configured to rotate in response to a rotational input.

2. The expandable component of claim 1, wherein the rotatable member is substantially circular, having a curvature, and comprises a gripping portion, wherein the gripping portion is an indent.

3. The expandable component of claim 1, wherein the guiding portion comprises:
- a guide located on the rotatable member; and
- a ridge abutting the connecting member;
- wherein the ridge is arranged in communication with the guide.

4. The expandable component of claim 3, wherein the guide extends from a first radial position of the rotatable member to a second radial position of the rotatable member.

5. The expandable component of claim 4, wherein the second radial position has a greater radial displacement relative to a centre of the rotatable member, than the first radial position.

6. The expandable component of claim 4, wherein the guide is an indent comprising an indent curvature.

7. The expandable component of claim 1, wherein the outer boundary is a rigid bar.

8. The expandable component of claim 7, wherein the bar comprises:
- a bar curvature substantially matching the curvature of the rotatable member; and
- an adhesive portion.

9. The expandable component of claim 1, further comprising:
- a sensor located on an outer portion of the outer boundary, configured to sense a proximity of the outer boundary to the object;
- a driving member in communication with the rotatable member, configured to rotate the rotatable member; and
- a microcontroller in communication with the sensor and the driving member, configured to:
  - receive a sensor signal from the sensor;
  - activate the driving member; and
  - deactivate the driving member in response to a contact signal indicative of the outer boundary contacting the object.

10. The expandable component of claim 9, wherein the sensor is any one selected from the range of:
- a proximity sensor; and
- a pressure sensor.

11. The expandable component of claim 9, wherein the microcontroller is in communication with a remote computing device, the remote computing device being configured to transmit one selected from the range of:
- an activation signal; and
- a deactivation signal.

12. The expandable component of claim 9, further comprising a physical resistance sensor in communication with the driving member, said physical resistance sensor being configured to:
- measure a physical resistance of the driving member; and
- transmit a resistance signal.

13. The expandable component of claim 9, wherein the microcontroller is configured to:
- activate the driving member in response to an activation signal; and
- deactivate the driving member in response to a deactivation signal.

14. The expandable component of claim 1, wherein an outer side of the outer boundary comprises a first height and an inner side of the outer boundary comprises a second height, wherein the first height is greater than the second height such that the outer boundary comprises a substantially sloped face.

15. The expandable component of claim 1, further comprising an elastic portion connecting the outer boundary to the rotatable member, configured to expand as the outer boundary moves from the first position to the second position.

16. The expandable component of claim 1, further comprising a charging device, wherein the charging device is a charging coil connected to the outer boundary and the rotatable member, configured to move in line with the outer boundary as the outer boundary moves from the first position to the second position.

17. The expandable component of claim 1, comprising:
- a plurality of outer boundaries configured to surround the rotatable member;
- a plurality of connecting members, each corresponding to a respective outer boundary; and
- a plurality of guiding members, each corresponding to a respective connecting member;
  - wherein, in the first position, the outer boundaries form a concentric circle with the rotatable member.

18. The expandable component of claim 17, further comprising a plurality of charging devices, wherein:
- at least one of the plurality of charging devices are attached to a respective outer boundary such that:
  - in the first position, the plurality of charging devices are configured to form a stack, wherein the stack is centred on the centre of the rotatable member; and
  - in the second position, the outer boundary charging devices are displaced from the centre of the rotatable member with the respective outer boundary.

19. A method of expanding an expandable charging device comprising the steps of:
- transmitting, via a remote device, an activation signal to a microcontroller;
- activating, via the microcontroller, a driving member;

driving, via the driving member, a ridge along a guide between a first position to a second positon, such that an outer boundary expands radially outwards with respect to a rotatable member;

receiving a proximity signal, from a proximity sensor, said proximity signal being indicative of an outer boundary being in proximity to an object; and receiving a resistance signal, from a physical resistance sensor, the resistance signal indicative of the ridge reaching the second position; and deactivating, via the microcontroller, the driving member in response to one selected from the range of:

the proximity signal meeting a proximity signal threshold; and the resistance signal reaching a resistance signal threshold such that the expandable charging device no longer expands.

20. A method of contracting an expandable charging device comprising the steps of:

transmitting, via a remote device, a deactivation signal to a microcontroller;

activating, via the microcontroller, a driving member;

driving, via the driving member, a ridge along a guide between a second position to a first position, such that an outer boundary contracts radially inwards with respect to a rotatable member;

receiving, from a physical resistance sensor, a resistance signal, the resistance signal indicative of the ridge reaching the first position; and deactivating, via the microcontroller, the driving member in response to the resistance signal meeting a resistance signal threshold.

* * * * *